(No Model.)

J. W. CARTER, Jr.
MANUFACTURE OF RUBBER BATTERY CELLS.

No. 341,552. Patented May 11, 1886.

WITNESSES:
Jos. U. Rosenbaum
Martin Petry

INVENTOR
John W. Carter Jr.
BY
Gophen Raegener
ATTORNEYS.

UNITED STATES PATENT OFFICE.

JOHN W. CARTER, JR., OF BROOKLYN, NEW YORK.

MANUFACTURE OF RUBBER BATTERY-CELLS.

SPECIFICATION forming part of Letters Patent No 341,552, dated May 11, 1886.

Application filed February 6, 1886. Serial No. 190,969. (No specimens.)

*To all whom it may concern:*

Be it known that I, JOHN W. CARTER, Jr., of Brooklyn, county of Kings, and State of New York, have invented certain new and useful Improvements in Manufacture of Rubber Battery-Cells, of which the following is a specification.

Heretofore rubber battery-cells were molded within a suitable mold, the rubber being pressed against the inner sides of the mold by means of bags filled with a material that expanded or otherwise; but the cells made in this manner frequently have air-bubbles and imperfect spots.

The object of this invention is to provide a new process for the manufacture of the rubber battery-cells, which process is simple and produces perfect articles.

The invention consists in molding cells on the outside of a suitable core or mold and vulcanizing the cells on said core or mold, all as will be fully described and set forth hereinafter, and then pointed out in the claims.

Figure 1:
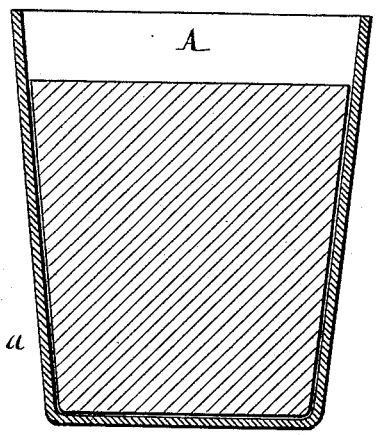
Figure 2:
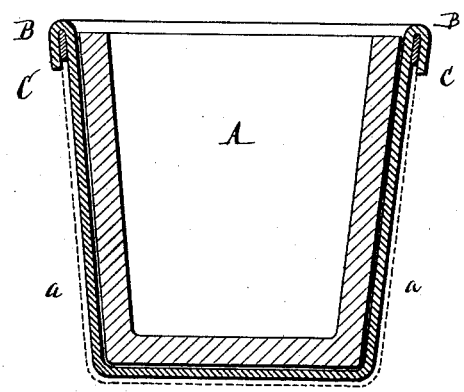
Figure 3:
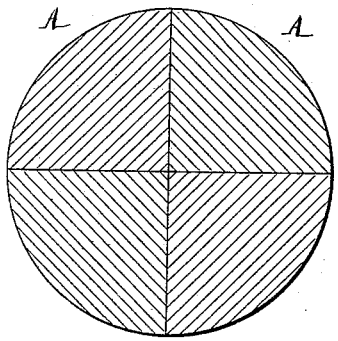
Figure 4:
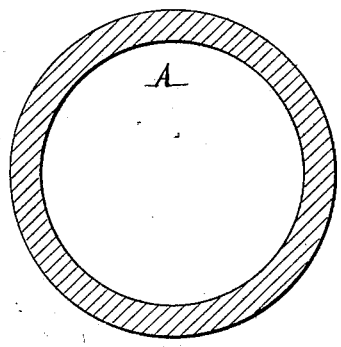

In the accompanying drawings, Figure 1 is a cross-section, $a'$ a view of the core with the rubber cell on the outside of the same. Fig. 2 is a cross-sectional elevation of a different cell, another construction of core being shown. Fig. 3 is a sectional plan view of a sectional core, and Fig. 4 is a sectional plan view of a hollow core.

Similar letters of reference indicate corresponding parts.

The sheet-rubber $a$, for forming the cell, is placed on the outside of a hollow core, A, of suitable shape, so that the cell formed by the rubber on the outside of said core can be readily withdrawn from the core. The rubber is vulcanized while on the core and then the core is withdrawn. The core may be solid, as shown in Fig. 1, or composed of sections, as shown in Fig. 3, or it may be made hollow, as shown in Figs. 2 and 4. The rubber battery-cell may be placed in a sheet-metal or other casing, or may be used without the same, as desired. In case the battery-cell is to be surrounded by a sheet-metal casing, I provide the cell at its upper edge with an undercut or grooved flange, B, for covering the top edge of the casing and protecting the same from the effects of the acids or other chemicals in the cell. To form said undercut or grooved flange, the rubber on the outside of the mold is surrounded, some distance from its upper edge, by a ring, C, of greater or less thickness, according to the thickness of the casing into which the rubber cell is to be placed, and the rubber is then turned down on the outside of said ring C. The cell is then vulcanized and the ring C withdrawn from the groove formed by folding the rubber on the outside of the ring. The top edge of the casing can be passed into the groove formed, and is thus fully protected. By molding the rubber on the outside of the core the operator is enabled to smooth and adjust the rubber, so that it is of uniform thickness throughout, fits snugly on the core, thus preventing any irregularity in the shape or thickness of the cell. If desired, the mouth of the cell may be flared.

Having thus described my invention, I claim as new and desire to secure by Letters Patent—

1. The process herein described of forming rubber battery-cells provided at the top with an exterior undercut or grooved flange, consisting in molding the rubber on the outside of a core and turning down the upper edges of the rubber toward the outside and then vulcanizing the cell while on the core, substantially as shown and described.

2. The process herein described of making rubber battery-cells provided at the upper edges with an exterior undercut or grooved flange, consisting in molding the rubber on the outside of a core, surrounding the rubber by a ring a short distance below the upper edge of the rubber, and then folding the rubber against the outer surface of said ring, and then vulcanizing the cell while on the core, substantially as shown and described.

In testimony that I claim the foregoing as my invention I have signed my name in presence of two subscribing witnesses.

JOHN W. CARTER, JR.

Witnesses:
OSCAR F. GUNZ,
CARL KARP.